United States Patent Office 3,781,391
Patented Dec. 25, 1973

3,781,391
METHOD FOR PRODUCING ACRYLIC HOLLOW FIBERS
Keitaro Shimoda, Keijiro Kuratani, and Akira Sugiura, Saidaiji, Japan, assignors to American Cyanamid Company, Stamford, Conn.
No Drawing. Continuation-in-part of abandoned application Ser. No. 792,819, Jan. 21, 1969. This application July 25, 1972, Ser. No. 274,935
Claims priority, application Japan, Jan. 24, 1968, 43/4,477
Int. Cl. D01f 7/00
U.S. Cl. 264—53          10 Claims

ABSTRACT OF THE DISCLOSURE

The formation of acrylic fibers with void spaces therein by wet spinning employing aqueous thiocyanate salts as both polymer solvent and fiber coagulant by dispersing selected volatile liquids in the spin dope at a concentration of 25–100 weight percent based on the weight of polymer therein, (a) spinning the spin dope into the coagulant maintained at less than about 20° C., (b) washing the coagulated wet gel fibers at a temperature below about 40° C. and (c) thereafter passing the fibers through boiling water or water vapor prior to or in conjunction with hot-drawing so as to volatilize the volatile liquid and obtain void spaces within the fibers.

---

This application is a continuation-in-part of application Ser. No. 792,819, filed Jan. 21, 1969, and now abandoned.

This invention relates to such a method wherein the fiber-forming acrylonitrile polymer is dissolved in a concentrated aqueous thiocyanate salt solution and is wet-spun into a cold aqueous thiocyanate salt solution as fiber coagulant.

A technique developed for producing hollow fibers by a wet spinning technique involves use of specially constructed spinnerette nozzles. This special construction is difficult to achieve and limits the number of orifices that can be provided in the spinnerette nozzle.

Another procedure employed to produce hollow fibers involves dry spinning an internally plasticized polymer solution to form fibers by evaporation of an organic solvent and subsequently wet processing the fibers formed. The hollow core is formed by dissolving out the plasticizer present in the fibers as formed, leaving hollow core areas in the places previously occupied by the plasticizer. This method is not adaptable for use in the cases where aqueous inorganic salt solutions are employed as solvent for the fiber-forming polymer, since this solvent type cannot be used in the required fiber formation by dry spinning.

Yet another method of preparing hollow fibers is described in British Pat. 1,016,051, and its counterparts, French Pat. 1,367,083 and Japanese Pat. 6,294/66 and 6,297/66. By this process, the hollow fibers are obtained by incorporating certain foaming agents in an acrylonitrile polymer dissolved in an organic solvent therefor and wet spinning the thus-modified polymer solution into a mixed water-organic solvent coagulant which removes the foaming agent from the fiber as it coagulated, such removal being accomplished by phase separation with the foaming agent phase being separated from the polymer solution phase into the coagulant phase where it remains as the coagulating advances through the processing equipment. In this described process, coagulation is carried out in stages, employing a number of coagulants and varying temperatures in the several stages. In one embodiment, coagulation is completed in a series of coagulants of water-organic solvent, wherein in progressive stages the water content of the coagulant increases and at least one stage is conducted at a temperature approaching or above 100° C. In other embodiments, the coagulant employed in subsequent stages is an organic solvent different from that of preceding stages without added water content, which solvent is ineffective as a polymer solvent but is more effective in phase separation of certain foaming agents from the fiber being coagulated. Thus, according to the process described in these reference patents, phase separation of the foaming agent from the fiber being coagulated is accomplished by proper selection of foaming agent and the choice of ingredients and conditions employed in conjunction with the staged coagulation procedure. In this manner, the fiber obtained upon coagulation already possesses the desired hollows and no subsequent provision for formation of hollows is necessary.

The process of the cited patents is not useful for producing hollow fibers when wet spinning of a fiber-forming acrylonitrile polymer is contemplated using an aqueous salt solution as polymer solvent and as fiber coagulant. There are various reasons the cited process cannot be employed. First, the cold aqueous inorganic salt solutions required for coagulation of fibers spun from aqueous inorganic salt solutions of fiber-forming acrylonitrile polymers are incapable of effecting phase separation of foaming agents from the fiber as it is coagulated. As a consequence, hollows are not formed in the fibers coincidental with coagulation thereof. Second, the concentration of foaming agent employed in the process of the cited patent is insufficient to provide hollows in fibers wet-spun using aqueous inorganic salt solutions both as polymer solvent and fiber coagulant. This is because the use of aqueous inorganic salt solutions causes a much greater degree of swelling of the wet gel state fiber than the corresponding fiber obtained using organic solvents. Although the concentration of foaming agent employed in the cited patents provides a desirable volumetric quantity of voids in fibers wet spun using organic solvents, this concentration is insufficient to provide a perceptible volumetric quantity of voids in fibers wet spun using aqueous inorganic salt solutions, particularly because of the high attendant squashing of voids accompanying compacting of the wet gel fiber. Third, since foaming agents of the cited patents are not removed from the coagulating fiber by phase separation when aqueous inorganic salt solutions are used in the wet spinning of fibers and these agents are too high boiling and insoluble to be removed in subsequent processing steps associated with wet spinning fibers employing aqueous inorganic salt solutions, there is no feasible manner known for removing the foaming agents and obtaining the desired void space.

In accordance with the present invention, there is provided a process for obtaining an acrylic fiber having uniformly distributed void spaces therein, which process comprises: preparing a solution of a fiber-forming acrylonitrile polymer containing at least 70 weight percent acrylonitrile and the balance of one or more monomers copolymerizable therewith in an aqueous thiocyanate salt solution containing from about 45 to 60 weight percent of calcium, sodium, potassium, or ammonium thiocyanate or a mixture thereof, so as to provide from about 8 to 15 weight percent of said polymer in the concentrated thiocyanate salt solution; dispersing in said polymer solution from about 25 to 100 weight percent based on the weight of polymer therein of a volatile liquid selected from carbon tetrachloride, butyl chloride, propyl chloride, allyl chloride, isoamyl chloride, benzene, cyclohexane, cyclohexadiene, cyclopentane, dimethylbutane, dimethylfuran, and carbon disulfide, so as to obtain a uniform distribution of said volatile liquid in said polymer solution; wet spinning the dispersion thus obtained into a coagulant which is an aqueous thiocyanate salt solution containing from about 3 to 20 weight percent of calcium, sodium, potassium, or ammonium thiocyanate or a mixture thereof, said coagulant being maintained at a temperature below about 20° C. so as to provide swollen wet gel fibers containing uniformly dispersed therein as a separate phase said volatile liquid; washing the swollen wet gel fibers in water at a temperature below 40° C. to remove residual polymer solvent and to prevent volatilization of the volatile liquid; and thereafter passing the fiber through steam or hot water at a point in processing subsequent to said washing but prior to or in conjunction with conventional hot drawing of the wet gel fiber structure so as to expand and volatilize the volatile liquid and provide void spaces in the resulting fiber.

The fiber produced in accordance with the process of the present invention has fine elongated void spaces distributed evenly throughout the body of the fiber and these void spaces are not squashed into non-existence in such subsequent fiber processing steps as drawing, drying-compacting, or mechanical crimping. The final product is a fiber of low density possessing excellent texture and elasticity. The process of the present invention is specifically useful for forming void spaces in acrylic fibers obtained by wet spinning fiber-forming acrylonitrile polymers wherein aqueous thiocyanate salt solutions are employed both as the polymer solvent and the fiber coagulant and wherein other procedures for obtaining such fibers are ineffective because of the specific use of said aqueous thiocyanate salt solutions. The present process provides the necessary volatile liquids, the required use concentration of said volatile liquids, and the necessary processing steps to provide the desired void spaces at the proper point in fiber processing to obtain the desired level of void spaces in acrylic fibers obtained by wet spinning employing aqueous thiocyanate salt solutions both as the fiber-forming polymer solvent and as the coagulant for the formed fiber.

The acrylic polymer which may be employed according to the process of the present invention may be any fiber-forming acrylonitrile polymer selected from the groups consisting of acrylonitrile homopolymers and acrylonitrile copolymers composed of at least 70% by weight of acrylonitrile and the balance of one or more monomeric compounds copolymerizable with acrylonitrile, irrespective of the method of polymerization. It may also be a mixed polymer consisting of two or more of such polymers. It is necessary, of course, that the polymer be a fiber-forming polymer and be soluble in the concentrated aqueous thiocyanate salt solutions to be used as polymer solvent. Useful polymers of the type contemplated are well known in the prior art and need no further identification.

As the solvent for use in the preparation of the spinning solution according to the present invention, use is made specifically of concentrated aqueous solutions of calcium, sodium, potassium, or ammonium thiocyanate, or mixtures thereof. The solution will generally contain from about 45 to 60 weight percent of thiocyanate salt, and preferably from about 48 to 55 weight percent of thiocyanate salt.

The proper concentration of polymer in the spinning solution varies somewhat depending upon the molecular weight of the polymer but generally is in the range of 8 to 15 weight percent of polymer based on the total weight of polymer and concetrated aqueous thiocyanate solution. The solution is conveniently prepared by dissolving polymer recovered from the polymerization process in concentrated aqueous thiocyanate salt solution. The molecular weight of the polymer is generally in the range of 30,000 to 200,000, preferably 40,000 to 100,000 as calculated from a viscosity measurement of the polymer in dimethyl formamide using the Standinger equation.

The coagulant used in the process of the present invention is an aqueous solution of calcium, sodium, potassium, or ammonium thiocyanate, or a mixture thereof, wherein the thiocyanate salt concentration is in the range of about 3 to 20 weight percent, preferably at least 5 weight percent, based on the total weight of salt and water. The coagulant is maintained at a temperature below about 20° C., preferably below 10° C. and may be below 0° C., e.g. —9° C. to —0.5° C., if desired. Such requirement is necessary in the conventional spinning process employing aqueous inorganic salt solutions to minimize or obviate formation of a dense skin on the surface of the individual filaments upon subsequent drying, which skin causes disadvantages in ease of drying, dyeability, and related properties.

The process of the present invention follows the conventional wet spinning process involving aqueous salt solutions as polymer solvents and fiber coagulants in material requirements and processing steps except for provisions necessary to obtain the void spaces within the resulting fiber. That is to say, unless otherwise specifically stated herein, it is to be understood that conventional procedures are normally employed.

In carrying out the process of the present invention, a conventional spinning solution of a fiber-forming acrylonitrile polymer is prepared in a concentrated inorganic thiocyanate salt, following the concentration limits previously given. Next, a volatile liquid of the group specified is uniformly dispersed in the spinning solution in an amount as previously specified. During such dispersion and while the volatile liquid is dispersed in the spinning solution, it is necessary to maintain the spinning solution at a suitable temperature and pressure to prevent volatilization of the volatile liquid therefrom. All of the volatile liquids specified have a boiling point within the range of about 40 to 100° C. and pressure and temperature conditions at which the spinning solution is maintained during dispersion and spinning should be such as to maintain the volatile liquid in liquid form.

After the dispersion has been obtained in the form of a uniform distribution of volatile liquid in the spinning solution, it is wet spun into a coagulant of aqueous inorganic thiocyanate salt solution maintained at a temperature below about 20° C. and containing the specified amount of thiocyanate salt. The coagulant is not a solvent for the polymer, but results in a reduced rate of coagulation relative to water alone and provides desirable advantages in fiber properties over the use of water alone, as is known in accordance with the conventional procedure. The low temperature employed in coagulation as well as the particular nature of the aqueous thiocyanate salt solution employed therein maintain the dispersed droplets of volatile liquid uniformly distributed as a separate phase within the fiber as it is coagulated. Upon completion of the coagulation step, there is obtained a completely coagulated and swollen wet gel fiber containing uniformly distributed therein droplets of the volatile liquid. No void spaces are obtained at this point in processing since the volatile liquid has not as yet been removed from the formed fiber.

After coagulation is complete, the swollen wet gel fiber is next thoroughly washed with water so as to remove any residual coagulant and such washing is carried out at a temperature that does not cause volatilization of the volatile compound, preferably at a temperature well below the boiling point of the volatile liquid. Thus, after completion of both the coagulation and washing steps normally associated with the wet spinning process, there is obtained a swollen wet gel fiber, fully coagulated and essentially free of inorganic thiocyanate salt, which contains uniformly distributed therein as a separate phase, droplets of the volatile liquid.

After the above specified steps of the process of the present invention have been carried out in the manner specified, the next step in the process may be one of two options. One option is to pass the fiber through a heated medium of hot water or steam to volatilize the volatile liquid and form void spaces in the fiber thus treated. In this option, the treating step is an added step with respect to conventional wet spinning and serves the purpose of vacating volumetric proportions of the formed fiber containing volatile liquid, thereby creating as void spaces those volumetric proportions of the fiber initially occupied by the volatile liquid. It is, of course, necessary to employ a heated medium which is at a sufficient temperature to volatilize the volatile liquid. It is generally preferred to employ a medium which is at a temperature sufficiently above the boiling point of the volatile liquid to effect a rapid volatilization of the volatile liquid. By effecting volatilization as rapidly as possible, the relative volume of void space will be maintained at substantially the same volume of space initially occupied by volatile liquid. By this treatment, the swollen gel filaments are being set simultaneously with volatilization of the volatile liquid and any reduction in volume of void space in the subsequent drawng and drying steps is prevented. In addition, since the removal of the volatile liquid is effected in a distinct step, recovery thereof is readily accomplished.

The fiber in which void spaces have thus been formed is then drawn in hot water at a temperature of at least 80° C. so as to bring the fiber to an adequate degree of orientation, whereupon the properties of the fibers are improved to practical strength and elongation levels. As the fiber is hot-drawn, the void spaces within the fiber are elongated longitudinally of the fiber, with the result that the fiber is provided with fine elongated void spaces distributed uniformly throughout its length. While such an orientation can be accomplished in one operation, the same result may be attained by cold-drawing the fiber somewhat in a water bath at room temperature by taking advantage of the cold-stretchability of the undrawn filament and then drawing the same further at one elevated temperature, or alternatively, by carrying out the hot-drawing in several successive steps. It is also possible to effect the hot-drawing by use of heated water vapor.

The second option in processing the fiber after completion of coagulation and washing, as described above, is to effect volatilization of the volatile compound in conjunction with the hot drawing step, described immediately above. In this option, no added step for volatilization is employed and instead volatilization is effected by conducting at least one hot drawing step in a heated medium at a temperature sufficient to volatilize the volatile liquid while fiber orientation is also being effected. Rapid volatilization is preferred as before and a medium of suitable temperature is accordingly employed in the hot-drawing step. The results obtained by the second option are substantially the same as in the first option.

The swollen gel fiber with void spaces and oriented by hot-drawing is then compacted by drying. To obtain optimum fiber properties, specified conditions of drying are employed. Preferred drying conditions are those in which the temperature-humidity conditions are within the range defined by wet bulb temperatures of 65° C. to 85° C. when the dry bulb temperature is at the lower limit of 90° C. and wet bulb temperatures of 65° C. to 90° C. when the dry bulb temperature is at the upper limit of 135° C. Drying conducted outside the preferred range of conditions given may lead to inadequate compacting, loss of fiber transparency, some loss of void space volume, or a combination thereof. However, when the preferred conditions of drying are employed, the various problems are completely avoided.

The formed fiber containing void spaces which has been compacted by drying is then further heat-relaxed, crimped, oiled and dried in accordance with conventional procedures.

The invention is illustrated by the following examples in which all parts and percentages are by weight.

In the examples, the droplet size of the volatile liquid dispersed in the spinning solution was measured as follows.

A glass plate was coated with the spinning solution in which the volatile liquid was dispersed. The coating was as a thin layer which was then coagulated with water at a temperature of 5° C.

The resulting film was then observed microscopically to measure the diameter of the droplets dispersed therein.

EXAMPLE 1

A copolymer composed of 90% acrylonitrile and 10% methyl acrylate was dissolved in a 48% aqueous solution of sodium thiocyanate at 70° C. to obtain a solution containing 10% of polymer and the solution was deaerated. After the solution had cooled to 25° C., carbon tetrachloride was added as a volatile liquid in the amount of 60% based on the weight of polymer in the spinning solution. The mixture thus obtained was vigorously agitated by means of a mixer to uniformly disperse the carbon tetrachloride as droplets throughout the spinning solution, the droplets being of diameter between 6 and 8 microns. The resulting dispersion was deaerated at a pressure equivalent to 300 mm. of mercury and then extruded through a spinning nozzle containing 50 orifices, each of 0.09 mm. diameter. Extrusion was into a coagulation bath maintained at 0° C., which coagulation bath was a 10% aqueous solution of sodium thiocyanate. The spinning dope was at a temperature of 50° C. during spinning and the extruding pressure was 4.5 kg./cm.$^2$.

The coagulated swollen wet gel fibers emerging from the coagulation bath contained uniformly distributed therein droplets of carbon tetrachloride. The coagulated swollen wet gel fibers were then washed thoroughly in water at 30° C. so as to provide swollen wet gel fibers containing uniformly distributed therein droplets of carbon tetrachloride, which fibers were substantially free of thiocyanate salt.

The coagulated and washed swollen wet gel fibers thus obtained were next passed through boiling water which effected rapid volatilization of carbon tetrachloride from the fibers and resulted in void spaces being created thereby, the void spaces being the volumetric fibers proportions initially occupied by carbon tetrachloride.

Following volatilization of the carbon tetrachloride, the fiber was stretched at a stretch ratio of 8 in boiling water and dried in hot air at a dry-bulb temperature of 110° C. and a wet-bulb temperature of 65° C.

The dried fiber was then heat-relaxed in saturated water vapor at 220° F. A photomicrograph of a cross-section of the resulting fiber revealed a uniform distribution of void spaces throughout the formed fiber.

EXAMPLE 2

The procedure of Example 1 was followed in every essential detail except that the coagulated and washed swollen wet gel fibers were passed directly to the stretching step, thus eliminating the preliminary treatment with boiling water to effect volatilization of the carbon tetrachloride.

A similar fiber to that of Example 1 was obtained.

COMPARATIVE EXAMPLE

The procedure of Example 1 was again repeated in every material detail except that in place of carbon tetrachloride, there was employed kerosene at the same usage level.

After the fiber had been completely processed, including the drying and heat-relaxing steps, the fiber obtained did not contain void spaces but instead contained uniformly dispersed therein droplets of kerosene.

We claim:

1. A process for obtaining an acrylic fiber having uniformly distributed void spaces therein, which process comprises: preparing a solution of a fiber-forming acrylonitrile polymer, containing at least 70 weight percent acrylonitrile and the balance of one or more monomers copolymerizable therewith, in an aqueous thiocyanate salt solution containing from about 45 to 60 weight percent of calcium, sodium, potassium, or ammonium thiocyanate, or a mixture thereof, so as to provide from about 8 to 15 weight percent of said polymer in the concentrated thiocyanate salt solution; dispersing in said polymer solution from about 25 to 100 weight percent based on the weight of polymer therein of a volatile liquid selected from carbon tetrachloride, butyl chloride, propyl chloride, allyl chloride, isoamyl chloride, benzene, cyclohexane, cyclohexadiene, cyclopentane, dimethylbutane, dimethylfuran, and carbon disulfide so as to obtain a uniform distribution of said volatile liquid in said polymer solution; wet spinning the dispersion thus obtained into a coagulant which is an aqueous thiocyanate salt solution containing from about 3 to 20 weight percent of calcium, sodium, potassium, or ammonium thiocyanate, or a mixture thereof, said coagulant being maintained at a temperature below about 20° C. so as to provide swollen wet gel fibers containing uniformly dispersed therein as a separate phase said volatile liquid; washing the swollen wet gel fibers in water at a temperature below about 40° C. to remove residual polymer solvent and to prevent volatilization of the volatile liquid; and thereafter passing the fiber through steam or hot water at a point in processing subsequent to said washing but prior to or in conjunction with conventional wet drawing of the wet gel fiber structure so as to expand and volatilize the volatile liquid and provide void spaces in the resulting fiber.

2. The process of claim 1 wherein volatilization is effected by passing the fiber through boiling water subsequent to coagulation and washing but prior to hot drawing.

3. The process of claim 1 wherein volatilization is effected in conjunction with hot drawing in boiling water.

4. The process of claim 2 wherein the volatile liquid is carbon tetrachloride.

5. The process of claim 3 wherein the volatile liquid is carbon tetrachloride.

6. The process of claim 1 wherein the fiber-forming polymer is composed of 90% acrylonitrile and 10% methyl acrylate.

7. The process of claim 1 wherein the spinning solution comprises a fiber-forming acrylonitrile polymer dissolved in 48% aqueous sodium thiocyanate.

8. The process of claim 1 wherein the coagulant is 10% aqueous sodium thiocyanate.

9. The process of claim 1 wherein said coagulant is maintained at 0° C.

10. The process of claim 1 wherein the volatile liquid is carbon tetrachloride at 60 weight percent based on the weight of polymer in said spinning solution.

References Cited
UNITED STATES PATENTS

| | | | |
|---|---|---|---|
| 3,410,819 | 11/1968 | Kourtz et al. | 260—29.6 AB |
| 3,447,998 | 6/1969 | Fitzgerald et al. | 161—173 |

FOREIGN PATENTS

| | | | |
|---|---|---|---|
| 1,016,051 | 1/1966 | Great Britain | 264—182 |
| 6,294 | 4/1966 | Japan | 264—182 |
| 6,297 | 4/1966 | Japan | 264—182 |

JAY H. WOO, Primary Examiner

U.S. Cl. X.R.
264—182, 209, 211